(12) United States Patent
Kaser

(10) Patent No.: US 6,789,605 B1
(45) Date of Patent: Sep. 14, 2004

(54) SEALING ELEMENT FOR A REGENERATIVE HEAT EXCHANGER

(76) Inventor: Jackie L. Kaser, 31900 Via Del Senor, Homeland, CA (US) 92548

( * ) Notice: Subject to any disclaimer, the term of this patent is extended or adjusted under 35 U.S.C. 154(b) by 123 days.

(21) Appl. No.: 10/178,061

(22) Filed: Jun. 19, 2002

Related U.S. Application Data

(60) Provisional application No. 60/370,952, filed on Apr. 8, 2002.

(51) Int. Cl.[7] ................................................ F23L 15/02
(52) U.S. Cl. ................................ 165/9; 165/8; 277/553
(58) Field of Search ........................ 165/8, 9, DIG. 20, 165/DIG. 21, DIG. 26; 277/550, 553

(56) References Cited

U.S. PATENT DOCUMENTS

| | | | |
|---|---|---|---|
| 3,692,097 A | * | 9/1972 | Penny ............................. 165/9 |
| 3,730,538 A | * | 5/1973 | Silverstone et al. ......... 428/556 |
| 4,098,323 A | * | 7/1978 | Wiegard et al. ............... 165/9 |
| 4,593,750 A | * | 6/1986 | Finnemore ..................... 165/9 |
| 5,137,078 A | * | 8/1992 | Borowy .......................... 165/9 |

* cited by examiner

Primary Examiner—Terrell McKinnon
(74) Attorney, Agent, or Firm—Knobbe, Martens, Olson & Bear, LLP

(57) ABSTRACT

Disclosed is an improved sealing element for a regenerative heat exchanging apparatus, such as a Ljungstrom™-type or a Rothemuhle™-type Preheater. The sealing element is mounted to a radial wall to provide a secure seal between the radial wall and an outer housing of the heat exchanging apparatus and prevent leakage between the hot gas conduit and cool air conduit. In one embodiment, the sealing element includes a reinforced mounting strip that is used to mount the sealing element to the radial wall. The sealing element also includes a sealing strip that maintains a sealing contact between the radial wall and outer housing and a support member that inhibits over-flexing of the sealing element. A set of bellows is positioned on the sealing element to provide the sealing element with flexibility and resiliency so that the sealing element maintains contact with the sealing surface even when the heat exchanging apparatus experiences warping and/or distortion from thermal stress.

31 Claims, 7 Drawing Sheets

SEALING ELEMENT FOR A REGENERATIVE HEAT EXCHANGER

RELATED APPLICATIONS

This application claims the benefit of U.S. Provisional Application No. 60/370,952, filed on Apr. 8, 2002, entitled "SEALING ELEMENT FOR REGENERATIVE HEAT EXCHANGER."

BACKGROUND OF THE INVENTION

1. Field of the Invention

The present invention relates to heat exchange technology and, in particular, relates to an improved sealing component that may be used to reduce leakage between a hot gas conduit and a cold air conduit of a regenerative heat exchanging system.

2. Description of the Related Art

Conventional regenerative heat exchangers are used to provide preheated air to heavy machinery, such as a fuel burning power plant and may be used with various types of machinery that exhausts hot gas and operates more efficiently when supplied with preheated air, such as, for example, chemical processors, refineries, pulp and paper mills, and ships. Typically, two fluid stream passages extend through the heat exchanger. The first passage may include a hot gas conduit that communicates with a hot exhaust outlet of the power plant. Hot exhaust gases flow from the power plant exhaust into the hot gas conduit of the heat exchanger. The second passage may include a cold air conduit that communicates with a cool air intake passage of the power plant. Cold air conduit feeds pressurized air into the intake passage of the power plant. As is known in the art, regenerative heat exchangers extract heat from the exhaust gases of the fuel burning power plant and transfers the heat to the cool air conduit.

As is also known in the art, leakage between the hot gas conduit and the cold air conduit reduces the thermal efficiency of heat exchangers. It is therefore desirable to provide a sealing mechanism between hot and cold conduits so that gas does not leak between the hot gas conduit and the cold air conduit. Therefore, seals may be mounted at the junctions between the movable heat exchanging body and the housing of the heat exchanging apparatus. Unfortunately, conventional seals have many disadvantages. For example, seals are typically exposed to harsh operating conditions, such as erosive fly ash and soot. As the heat exchanging body moves with respect to the housing or vice versa, the seals are also exposed to mechanical abuse because the seals are positioned to maintain sliding contact with the sealing surfaces. Consequently, the seals wear down quickly.

Further, the high operating temperatures of the heat exchanging apparatus expose the seals to thermal stresses which often cause the seals to warp. The high operating temperature also causes thermal distortions in the shape of the structural members of the heat exchanging apparatus, such as the housing and center shaft. The distortions in the shape of the seals and the structural members affects the clearance between the seals and the sealing surfaces, often resulting in leakage paths between the hot gas conduit and the cold air conduit. This particular situation typically reduces the thermal efficiency of the heat exchanging apparatus and also reduces the overall efficiency of the system.

Conventional seal designs do not adequately address these problems. Some seals are made from relatively thick metal which holds up well against corrosion and mechanical abuse. However, such seals are not very flexible and often lose contact with the sealing surface when the structural members of the heat exchanging apparatus thermally distort. Other seals are extremely flexible so that they initially offer better sealing characteristics by expanding or contracting when the structural members thermally distort to maintain contact with the sealing surface. However, such seals hold up poorly to corrosion and mechanical abuse.

Certain prior art seals have been equipped with flexible portions that allow the seal to flex in response to deformations in the heat exchanger. For instance, U.S. Pat. No. 5,950,707 discloses a seal having resilient components that allow for flexible deformations. However, such seals may fracture or break when flexibly responding to torque stress loads that are produced by rotation of the heat exchanging body with respect to the outer housing of the heat exchanger. As a result, stress fractures may allow gas leakage between conduits.

Therefore, there exists a need for an improved resilient seal that may be used in conjunction with regenerative heat exchanging systems to reduce the adverse effects of rotational stress loads so as to substantially reduce the likelihood of leakage between hot and cold conduits. An improved resilient seal that resists corrosion abuse, mechanical abuse, and thermal distortion of the structural components would be preferred over conventional seals that are typically associated with regenerative heat exchanging systems and technology.

SUMMARY OF THE INVENTION

The aforementioned needs may be satisfied by the present invention, which relates to a seal assembly that is used to seal the angular sectors of a regenerative heat exchanging apparatus and prevent leakage between the hot gas conduit or exhaust conduit and the cold air conduit or intake conduit. The seal is advantageously configured to provide greater operating efficiency to a heat exchanging apparatus by ensuring positive contact between the heat exchanging body of a heat exchanger and the surfaces dividing the hot gas exhaust conduit and the cold air intake conduit and the sealing surfaces during relative movement therebetween even when exposed to harsh operating conditions and thermal distortion.

In one embodiment, a regenerative heat exchanging device comprises a plurality of radial and axial sector plates positioned so as to define an intake conduit and an exhaust conduit, wherein the intake conduit receives cool air so as to provide air to a power plant, and wherein the exhaust conduit receives heated gases that are exhausted from the power plant A rotor is attached to the plurality of radial and axial sector plates so as to rotate with respect thereto about an axis, wherein the rotor includes one or more heat absorbing sections that are alternatively rotated through the exhaust conduit and the intake conduit so that heat is absorbed in the exhaust conduit and is thereby transferred to the cool air in the intake conduit. The regenerative heat exchanging device has at least one seal having an outer edge, the at least one seal being mounted on an outer surface of the rotor so that the outer edge makes contact with an inner surface of the plurality of sector plates during rotation of the rotor so as to reduce the leakage of heat energy between the intake conduit and the exhaust conduit, wherein the at least one seal is deformable in a first direction that is opposite the direction of relative movement between the at least one seal and the inner surface in response to the outer edge of the at one seal making contact with the inner surface, and wherein the seal is simultaneously biased in a second direction opposite the first direction so that the outer edge of the at least one seal remains in contact with the inner surface over a range of distances between the rotor and the sector plate while the at least one seal rotates past the inner surface of the plurality of sector plates. A support member further reinforces the seal so as to inhibit damage to the seal during deformation of the seal in the first direction.

In another embodiment, a regenerative air preheater comprises an outer housing defining a first conduit and a second conduit, a heat exchanging body within the outer housing, the heat exchanging body configured to rotate with respect to the outer housing so that portions of the heat exchanging body are cyclically exposed to the first conduit and second conduit, and at least one seal located between the outer housing and the heat exchanging body, the seal including a mounting section connected to the heat exchanging body, a sealing section having a substantially straight outer edge that is contacting the outer housing, a means for resiliently and rotationally deflecting the seal in a direction opposite to a direction of rotation of the heat exchanging body so that the sealing section maintains contact with the outer housing over a range of distances between the heat exchanging body and the outer housing, and a means for reinforcing the seal in a manner so as to reduce over-flexing of the sealing section when the seal is deflected during rotation.

In yet another embodiment, a seal assembly for a regenerative preheater having a housing and a heat exchanging body that rotate with respect to each other in a first direction and define an interface therebetween comprises a seal member that is adapted to be interposed between the heat exchanging body and the housing so as to be positioned within the interface therebetween, wherein the seal member includes a deformable biasing section whereby the seal when in physical contact with at least a portion of both the housing and the heat exchanging body resiliently deforms in a second direction opposite the first direction of rotation between the housing and the heat exchanging body but is biased in the first direction, and a reinforcing member interposed between the housing and the heat exchanging body, wherein the reinforcing member is positioned with respect to the seal member so as to reinforce the seal member when the seal member is deformed in the first direction to thereby inhibit damage to the seal member as a result of the deformation.

These and other objects and advantages of the present invention will become more fully apparent from the following description taken in conjunction with the accompanying drawings. The illustrations are intended to illustrate, but not to limit, the invention.

DETAILED DESCRIPTION OF THE PREFERRED EMBODIMENT

Figure 1:
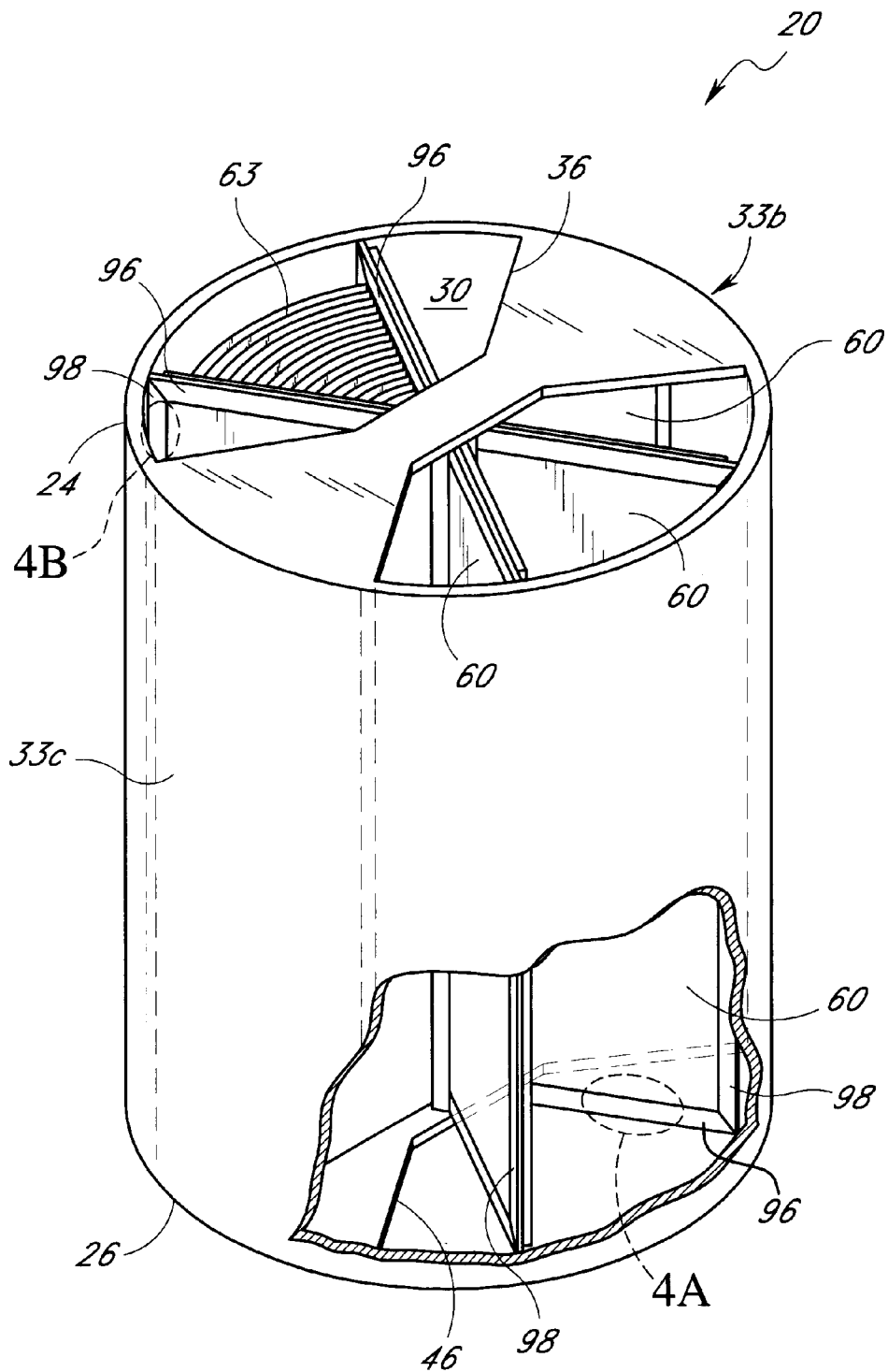
FIG. 1 is a perspective view of one embodiment of a regenerative heat exchanging apparatus in which an improved seal assembly having a reinforcing support member is used.
Figure 2:
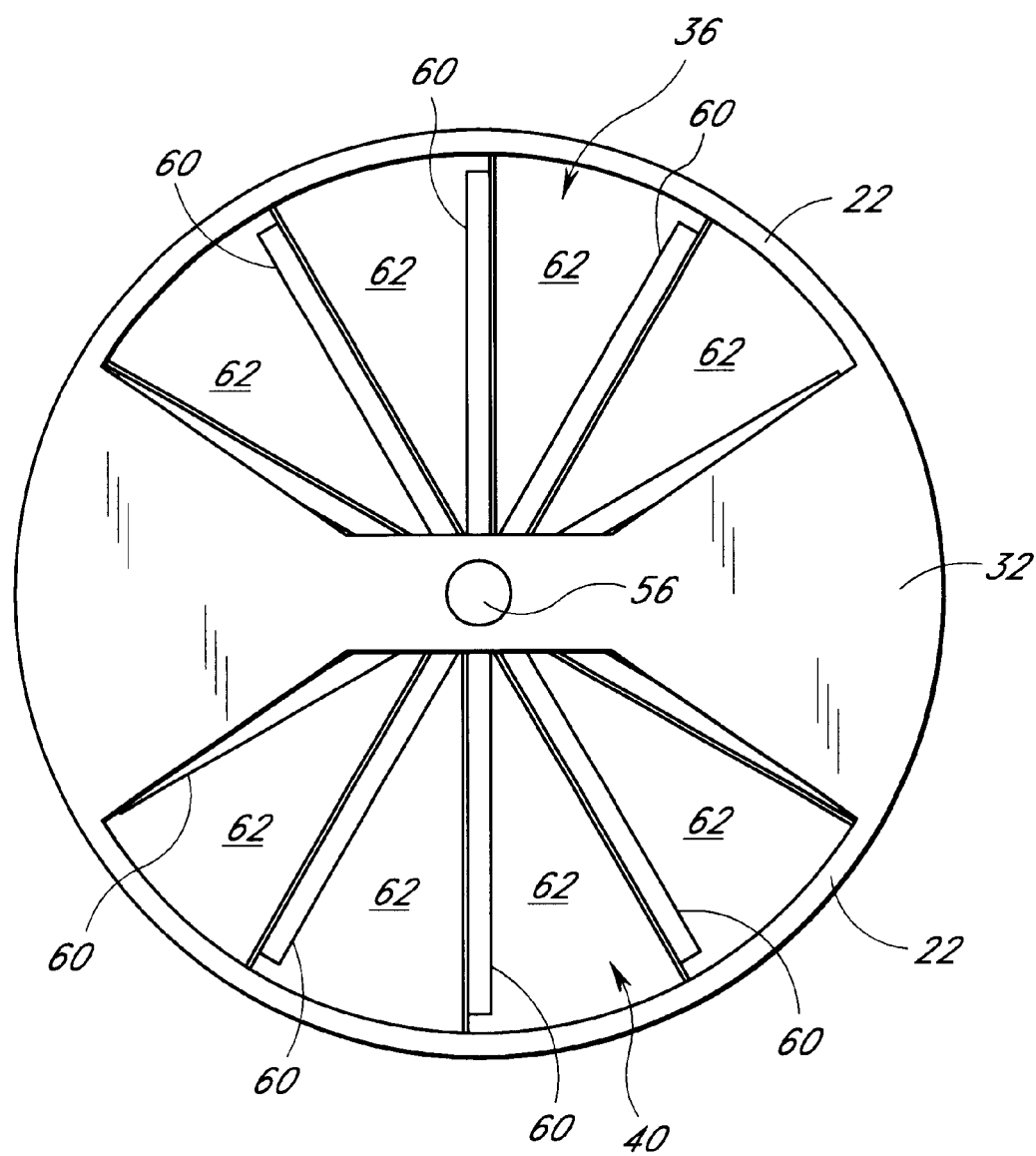
FIG. 2 is a top view of the regenerative heat exchanging apparatus of FIG. 1.

Reference will now be made to the drawings wherein like numerals refer to like parts throughout. FIG. 1 is a perspective view of one embodiment of a regenerative heat exchanging apparatus 20 in which a plurality of improved seal assemblies 96, 98 having at least one reinforcing support member (shown in FIGS. 4A, 4B, 5A, and 5B) is used. FIG. 2 illustrates a top view of the heat exchanging apparatus 20 of FIG. 1. The heat exchanging apparatus 20 includes an outer housing 22 that has a substantially cylindrical shape. The outer housing 22 has a top end 24 and a bottom end 26. As used herein, the words "top" and "bottom" are with respect to the drawings and are not intended to limit the scope of the invention. In one aspect, the heat exchanging apparatus 20 may comprise a generally known Ljungstrom™-type Air Preheater. In another aspect, the heat exchanging apparatus 20 may comprise a Rothemuhle®-type Regenerative Air Preheater, as described below. For purposes of further description relating to the regenerative heat exchanger and associated members, the Applicant's issued U.S. Pat. No. 5,950,707 dated Sep. 14, 1999 entitled "Sealing Element for a Regenerative Heat Exchanger" is hereby incorporated by reference in its entirety.

As illustrated in FIGS. 1 and 2, a movable heat exchanging body or rotor 53 is rotatably positioned within the outer housing 22. The heat exchanging rotor includes a rotatable center shaft 56 that is preferably aligned with the axial centerline of the outer housing 22. A plurality of radial walls 60 extend radially outward from the center shaft 56. A first improved seal assembly 96 having a reinforcing support member of the present invention, such as a radial seal 96 illustrated in FIG. 4A, may be mounted along each of the top and bottom edges of the radial walls 60. A second improved seal assembly 98 having a reinforcing member of the present invention, such as an axial seal 98 illustrated in FIG. 4B, may be mounted on the outer radial edge 61 of each of the radial walls 60. The axial seals extend axially along the length of the outer housing 20. It should be appreciated that the improved seal assemblies 96, 98 having reinforcing support members will be described in greater detail herein below with reference to FIGS. 4A, 4B, 5A, 5B.

In addition, the outer housing 22 has a side inner surface 30 that defines a hollow interior. The top end 24 of the outer housing 22 includes a top sector plate 32. A bottom sector plate 34 is located on the bottom end 26 of the outer housing 22. The bottom sector plate 34 is preferably aligned parallel to the top sector plate 32. Axial portions 33a and 33b of the housing 30 (indicated by dashed lines in FIG. 1) define axial sector plates of the assembly 20. The top sector plate 32, the bottom sector plate 34 and the axial sector plates 33a and 33b define the boundary, or interface, between the intake and outlet conduit of the regenerative air preheater.

In one aspect, the top sector plate 32 defines an intake or cool air aperture 36 that allows cool air to be passed into the interior of the heat exchanging apparatus 20. An exhaust hot gas aperture 40 is also defined by the top sector plate 32 for allowing hot gas to be passed out of the heat exchanging apparatus 20. The bottom sector plate 34 also defines an intake aperture 42 that is aligned below the intake aperture 36. An exhaust aperture 46 on the bottom end 26 is aligned directly below the exhaust aperture 40. Those skilled in the art will appreciate that the location of the inlets and outlets of the heat exchanging apparatus 20 may be reversed without departing from the scope of the present invention. Furthermore, the axis of the heat exchanging apparatus 20 is not limited to a vertical orientation as shown in FIG. 1, but could also be oriented horizontally or at any of a wide variety of orientations.

Figure 3:
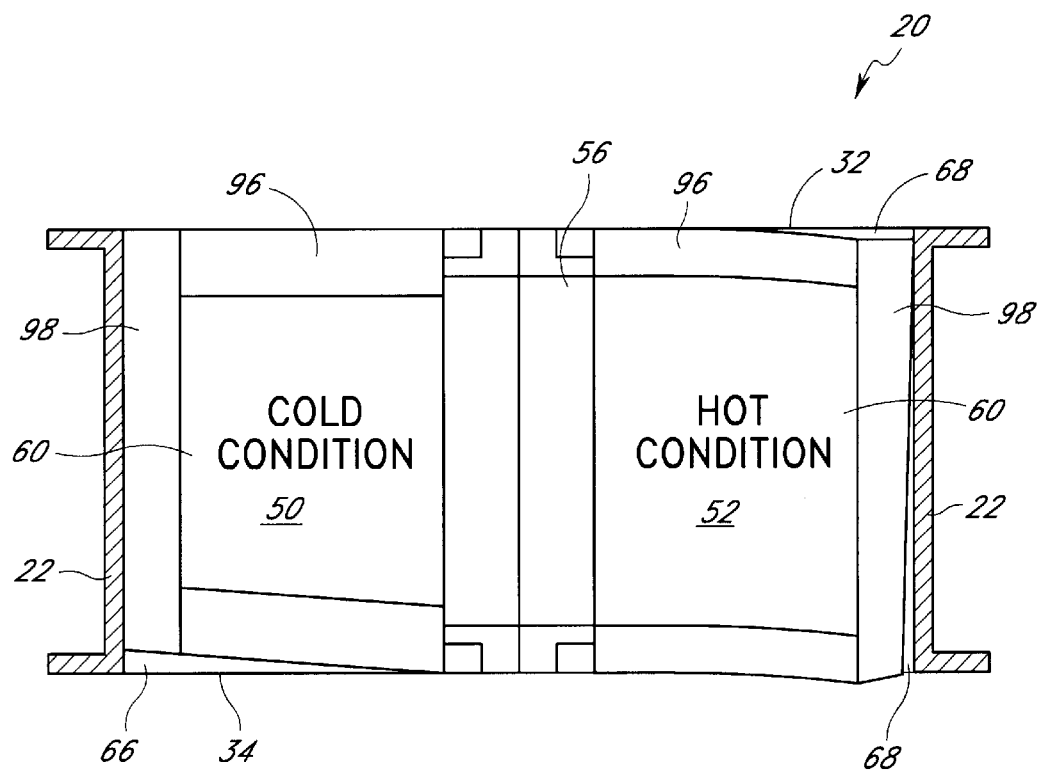
FIG. 3 is a schematic cross-sectional side view of the regenerative heat apparatus of FIG. 1.

The interior volume of the housing 22 between the top intake aperture 36 and bottom intake aperture 42 defines an intake conduit 50 (FIG. 3). During operation of the heat exchanging apparatus 20, air is fed through the intake conduit 50 into a power plant (not shown), as described below. Similarly, the exhaust gas aperture 40 and the bottom exhaust aperture 46 collectively define an exhaust conduit 52 therebetween that extends within the interior of the housing 22 from the top to the bottom of the heat exchanging apparatus 20. Hot exhaust gases are fed from the power plant through the exhaust conduit 52 during operation of the heat exchanging apparatus, as described below.

Figure 5A:
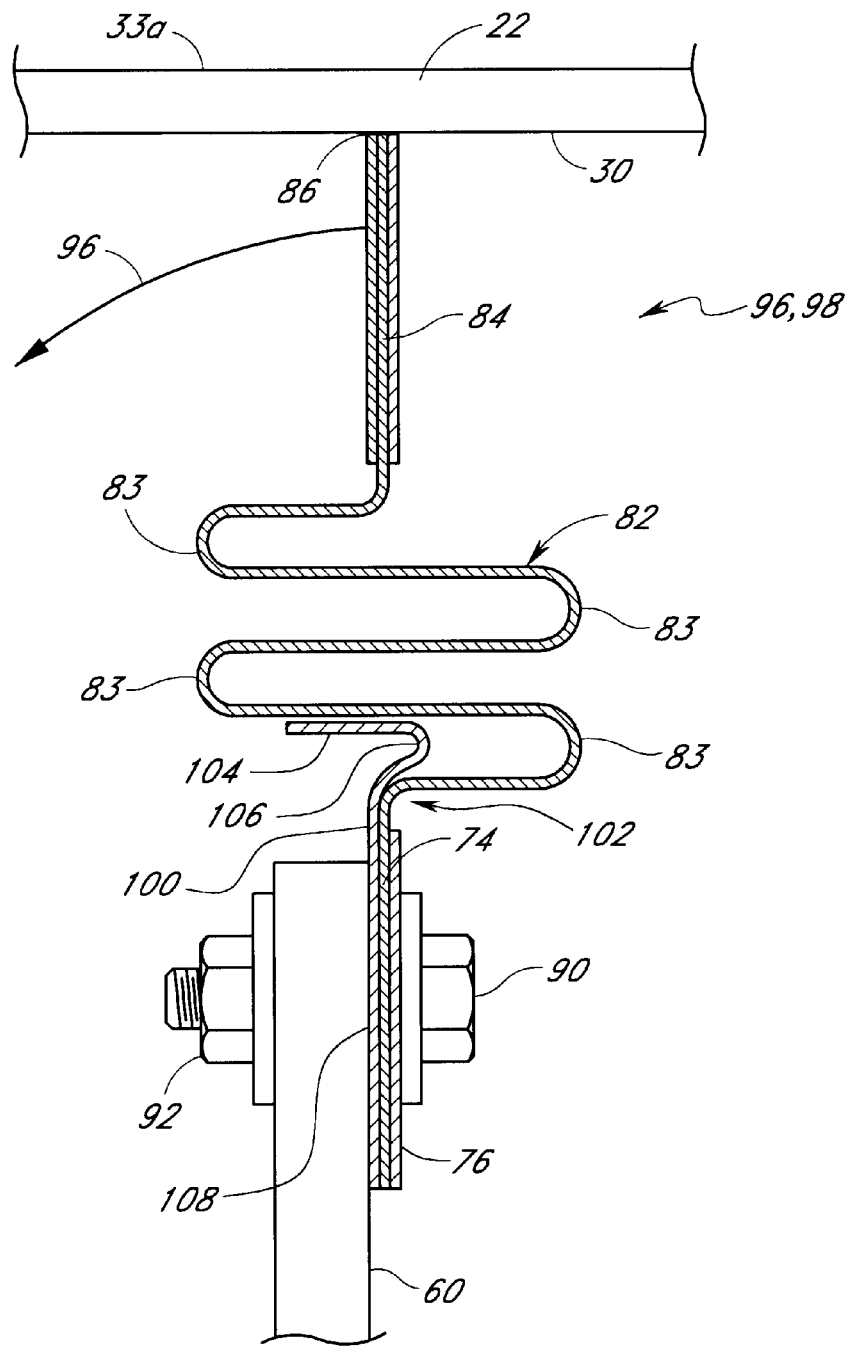
FIGS. 5A and 5B are side views of the seal assembly having a reinforcing support member, as illustrated in FIG. 4, mounted to a radial wall of the regenerative heat exchanging apparatus in FIG. 1.
Figure 5B:
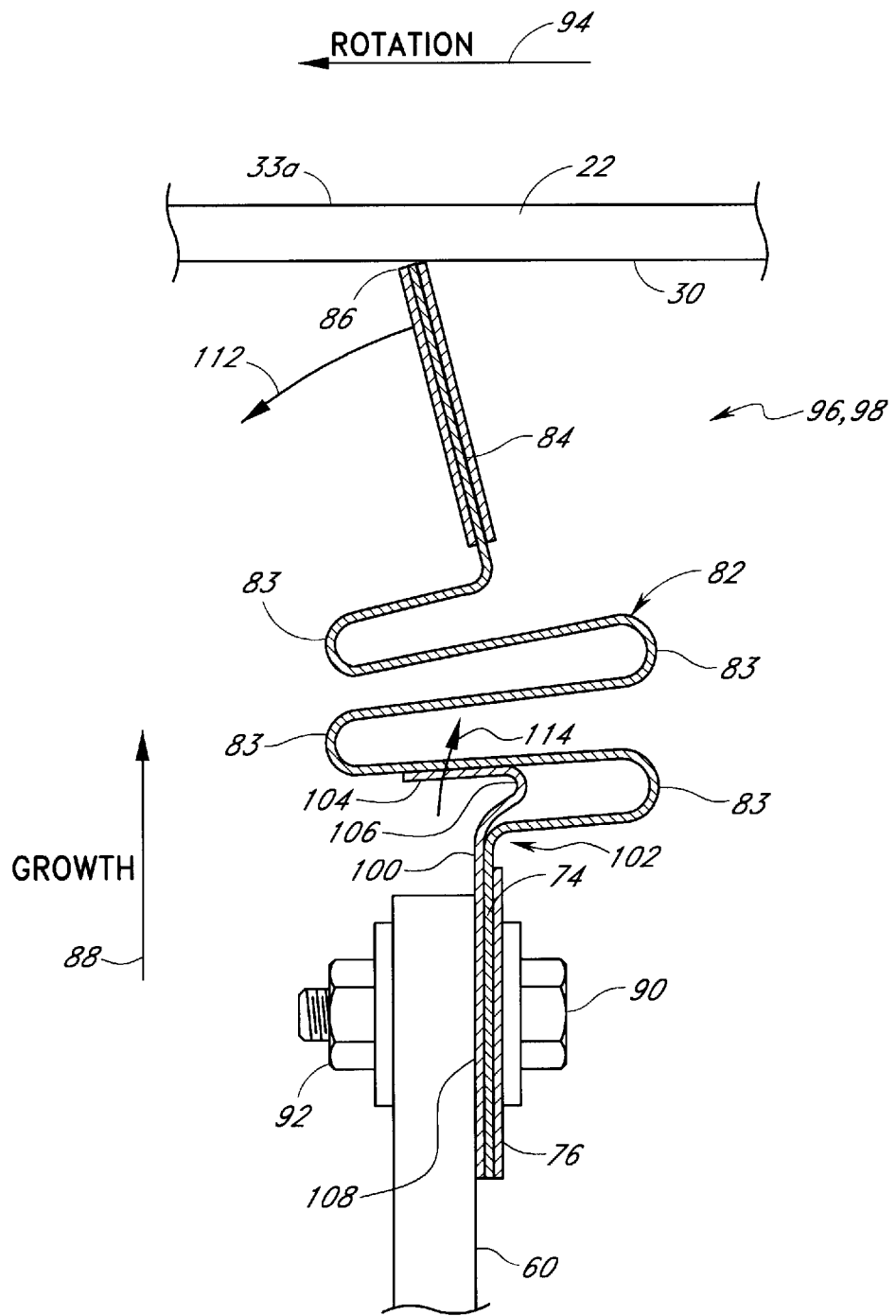
Figure 1:
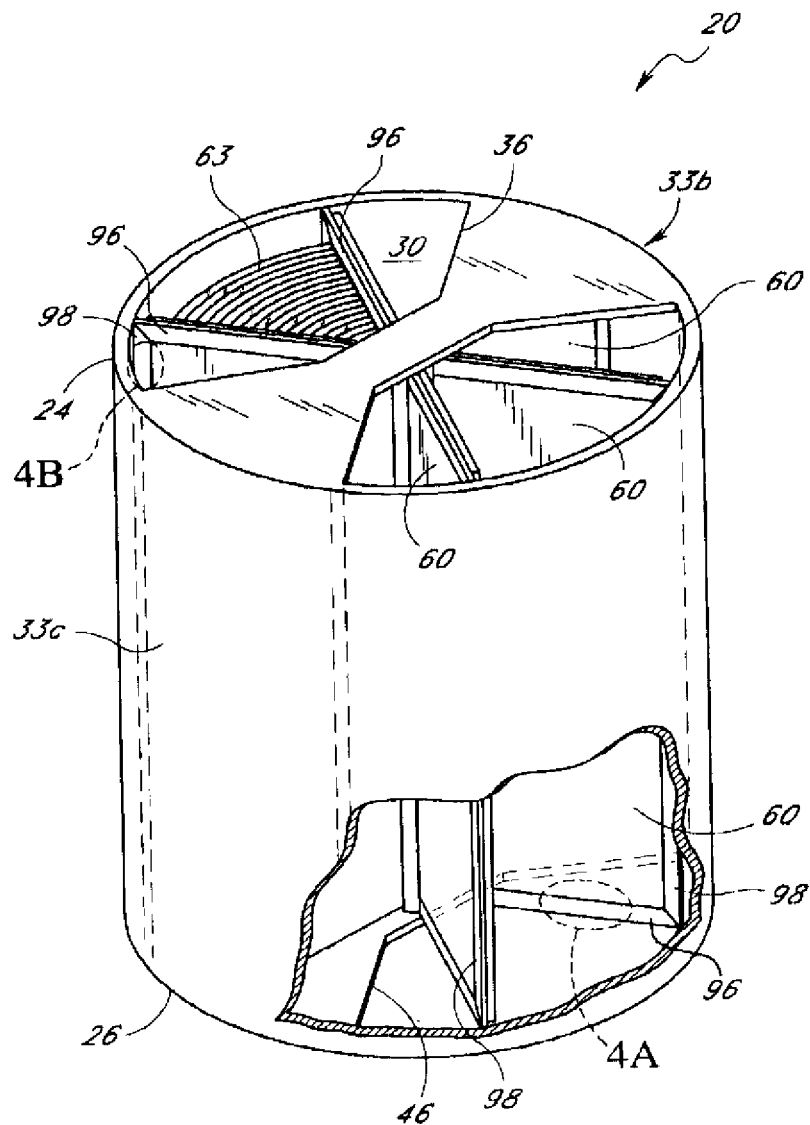

In one embodiment, the radial seals 96 are positioned on the radial walls 60 so that the outer edges of the radial seals 96 contact the inner surfaces of the sector plates 32 and 34 when the radial walls 60 are positioned between the sector plates 32 and 34 in the manner shown in greater detail in reference to FIGS. 5A and 5B. In this manner, the radial seals 96 provide a seal between the intake conduit 50 and the exhaust conduit 52, as described below. In addition, the axial seals 98 may be positioned such that the outer edges of the axial seals 98 contact the side inner surface 30 of the axial sector plates 33a and 33b. Advantageously, the axial seals 98 reduce leakage around the circumference of the housing 22 between the outer radial edges of the radial walls 60 and the side inner surface of the 30 of the axial sector plates 33a and 33b which divide the exhaust conduit 52 from the inlet conduit 50.

As further illustrated in FIG. 2, the radial walls 60 define a plurality of angular sectors 62 within the heat exchanging rotor 53. The angular sectors 62 extend from the top end 24 to the bottom end 26 of the heat exchanging apparatus 20 and communicate at either end with intake apertures 36, 42 and exhaust apertures 40, 46. Interposed between each radial wall 62 is a core sector 63. The core sector 63 may comprise of thin corrugated metal that is capable of absorbing heat from the exhaust of the power plant and then transferring this heat to the cool air in the intake conduit 50 in a manner that will be described in greater detail hereinbelow. For ease of illustration, the core sector 63 is shown in only one angular sector 62. In the actual embodiment, a core sector 63 is located in each of the angular sectors 62.

During operation of the heat exchanging apparatus 20 as a Ljungstrom™-type Air Preheater, the heat exchanging rotor 53 rotates within the outer housing 22 about the center shaft 56. As the heat exchanging rotor 53 rotates, the angular sectors 62 are alternately aligned with the cool air intake conduit 50 and the hot gas exhaust conduit 52. When aligned with the intake conduit 50, the tops and bottoms of the angular sectors 62 communicate with the top and bottom intake apertures 36 and 40, respectively. Similarly, when aligned with the exhaust conduit 52, the tops and bottoms of the angular sectors 62 communicate with the exhaust apertures 40 and 46. The angular sectors 62 thus function as passageways through which cool air or hot gas flows.

The heat exchanging apparatus 20 functions as a Ljungstrom™-type Air Preheater as follows. One end of the intake conduit 50 is connected to a supply of intake gas, such as air. The other end of the intake conduit 50 is connected to a destination location, such as the cool air inlet passage of a power plant (not shown). The exhaust conduit 52 is also connected to the destination location, such as a hot gas exhaust outlet of the power plant. Any type of piping or duct work known to those skilled in the art may be used to connect the power plant and air supply to the heat exchanging apparatus 20.

Air flows into the intake conduit 50 via the top intake aperture 36. The air flows through the particular angular sector 62 that is aligned with the intake conduit 50. The air then flows out of the heat exchanging apparatus 20 through the bottom intake aperture 42 and into the cool air intake passage of the power plant. The power plant exhausts hot gases into the hot gas conduit 52 through the bottom exhaust aperture 46. The hot gases pass through the particular angular sector 62 that is aligned with the exhaust conduit 52. The hot gases then flow out of the heat exchange apparatus 20 through the top exhaust aperture 40.

The heat exchanging body 53 continually rotates within the outer housing 22 as the above-described process occurs. Thus, each angular sector 62 alternately aligns with the cool air intake conduit 50 and the hot gas exhaust conduit 52 as the heat exchanging rotor 53 rotates. That is, the angular sectors 62 are cyclically exposed to the intake conduit 50 and the exhaust conduit 52. When a particular angular sector 62 is located between the sector plates 32 and 34, the radial seals 96 contact the inner surfaces of the sector plates 32, 34 to prevent leakage between the exhaust conduit 52 and the intake conduit 50. Similarly, the axial seals 98 contact the side inner surface of the axial sector plates 33a and 33b to prevent leakage around the circumference of the housing 22 between the exhaust conduit 52 and intake conduit 50.

When an angular sector 62 aligns with the exhaust conduit 52, the core material 63 (not shown) in the angular sector 62 absorb heat from the exhaust gas in a well known manner. The heat exchanging body 53 continues to rotate so that the particular angular sector 62 eventually becomes aligned with the cool air conduit 50. The heat collecting core then releases heat into the air flowing through the cool air conduit 52 to thereby warm the air.

The heat exchanging apparatus 20 can also be used to illustrate the basic operation of a Rothemuhle®-type Regenerative Air Preheater. The basic structure in this type of preheater is similar to the structure in a Ljungstrom™-type preheater, however, in a Rothemuhle®-type Regenerative Air Preheater the heat exchanging body 53 is fixed and the outer housing 22 rotates about the center shaft 56. Alternatively, a portion of the outer housing 22 or the duct work connecting the heat exchanger 20 to the power plant and air supply could rotate. In a Rothemuhle®-type preheater, the intake conduit 50 and exhaust conduit 52 rotate with respect to the heat exchanging body so that the angular sectors 62 are cyclically exposed to hot exhaust gases and cool air.

In both embodiments of regenerative air preheater, the heat exchanging apparatus 20 transfers heat from the hot exhaust gases of the power plant to the cool air that is being supplied to the power plant. This increases the operating efficiency of the attached power plant.

FIG. 3 is a schematic side view of the heat exchanging apparatus 20 illustrating the thermal deformations that the structural members of the heat exchanging apparatus 20 undergo during operation. The transfer of heat from the hot gas conduit 52 to the cool air conduit 50 creates temperature gradients throughout the heat exchanging apparatus 20.

These temperature gradients cause thermal distortions that may affect the shapes of the structural members, including the center shaft 56, the radial walls 60, the radial seals 96, and the axial seals 98. It should be appreciated that the thermal distortions of the various components of the heat exchanging apparatus 20 affects the clearance between the seals 96, 98 and the sealing surfaces (i.e., the inner surfaces of the sector plates).

As is shown in FIG. 3, the thermal gradients within the heat exchanging apparatus 20 causes the structural components of the heat exchanging apparatus to warp in shape. The left side of the heat exchanging apparatus in FIG. 3 illustrates the shape of the various structural components of the heat exchanging apparatus in an initial cold condition. As shown, a clearance gap 66 is often provided to compensate for the structural distortion that occurs during operation. The right side illustrates the shape of the heat exchanging apparatus in a hot condition. As shown, the thermal distortion causes the radial and axial seals 96, 98 to move away from the outer housing 22 of the heat exchanging apparatus and create leakage gaps 68 between the seals 96, 98 and the outer housing 22. Consequently, gas leaks between the hot gas conduit 52 and the cool air conduit 50 through the leakage gaps 68. This is highly undesirable as it reduces the thermal efficiency of the heat exchanging apparatus 20.

Figure 4A:
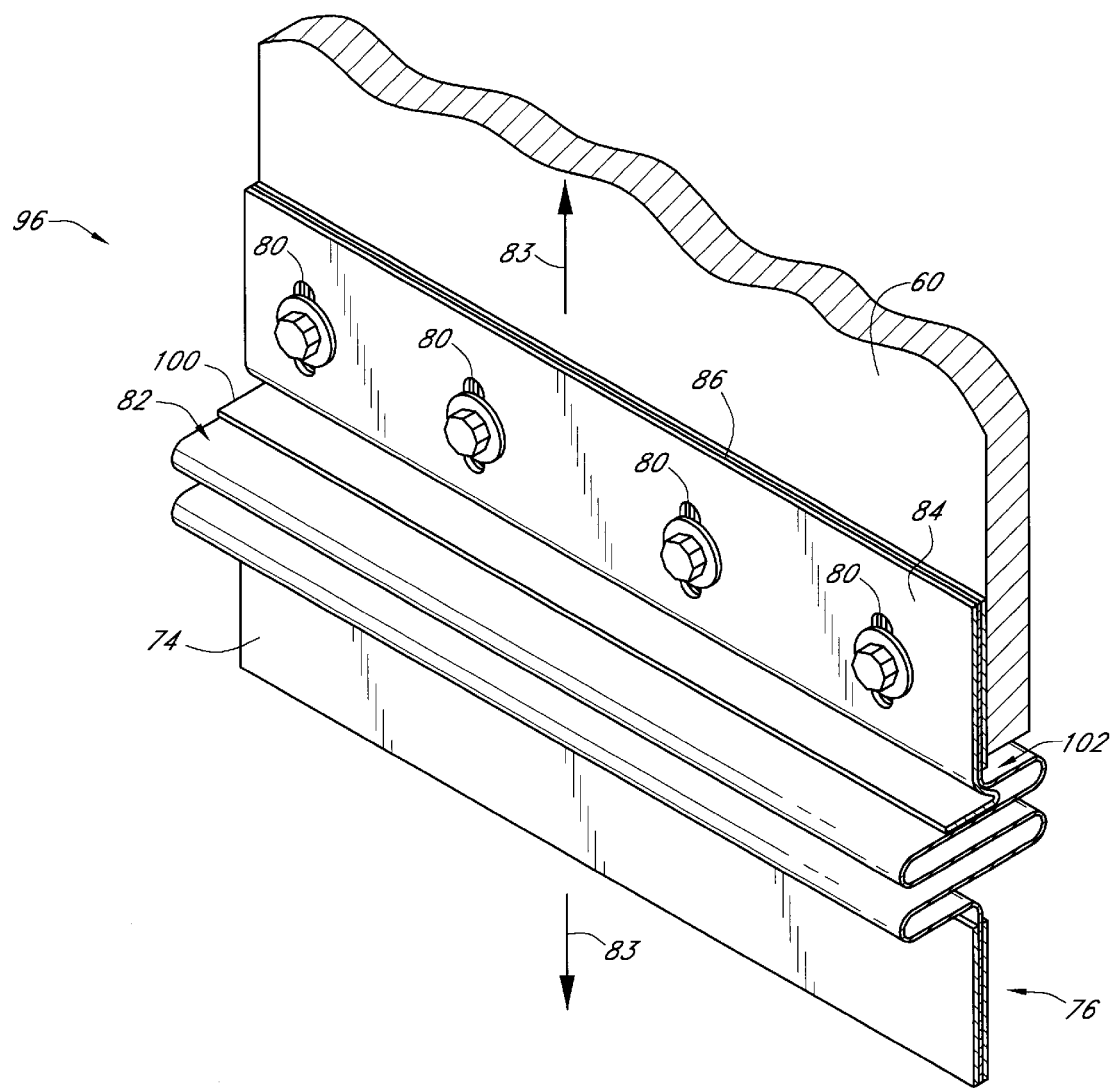
FIG. 4A illustrates a perspective view of one embodiment of the improved radial seal assembly that may be mounted along each of the top and bottom edges of the radial walls.
Figure 4B:
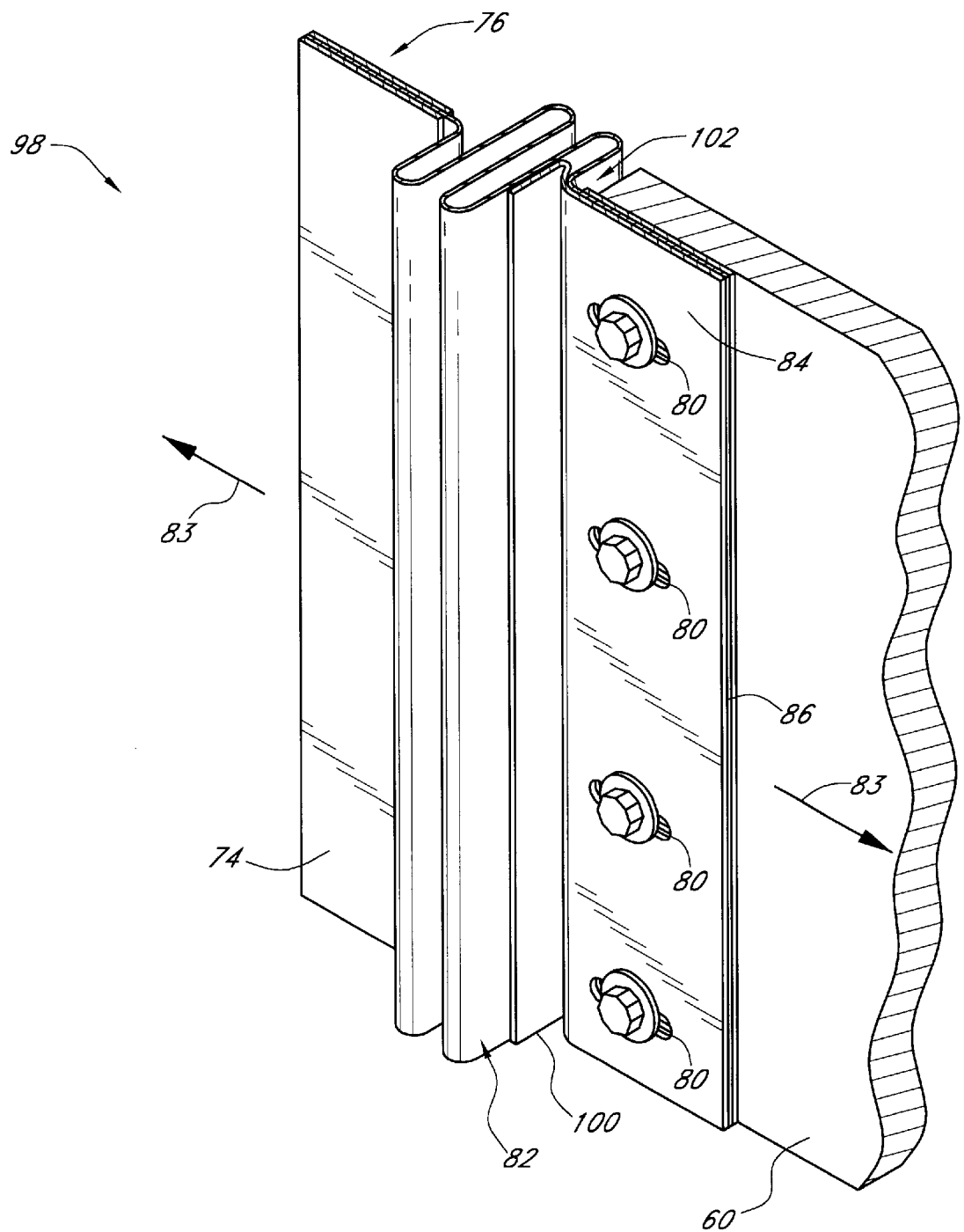
FIG. 4B illustrates a perspective view of one embodiment of improved axial seal assembly that may be mounted on the outer radial edge of each of the radial walls.

FIG. 4A illustrates a perspective view of one embodiment of the improved radial seal assembly 96 that may be mounted along each of the top and bottom edges of the radial walls 60. FIG. 4B illustrates a perspective view of one embodiment of improved axial seal assembly 98 that may be mounted on the outer radial edge of each of the radial walls 60. The illustrated seal assemblies 96, 98 may be mounted on an outer surface of at least one radial wall 60 to provide a secure seal between the radial wall 60 and the outer housing 22 so as to reduce leakage between the hot gas conduit 52 and the cool air conduit 50. In a manner as will be discussed in greater detail herein below, the improved seal assemblies 96, 98 advantageously maintain a secure seal even when exposed to thermal distortion of the heat exchanging apparatus 20.

In addition, the seal assemblies 96, 98 may also be resistant to the harsh operating conditions of the heat exchanging apparatus 20. It will be appreciated that the seal assembly 96, 98 may be mounted to the top or bottom edges of a radial wall 60, in which case it functions as the improved radial seal 96 to reduce leakage between the radial wall 60 and the sector plates 32, 34. Alternatively, the seal assembly 98 may also be mounted to the outer radial edge of the radial wall 60, in which case it functions as the improved axial seal 98 between the radial wall 60 and the side inner surface 30 of the outer housing 22. It should be appreciated by one skilled in the art that the exact dimensions of either seal assembly 96, 98 may vary depending upon the specific application and use of the seal assembly 96, 98.

Although illustrated in FIG. 1 as being mounted to the radial wall 60, the seal assembly 96, 98 may also be mounted to the outer housing 22 in certain circumstances without departing from the scope of the invention. In such circumstances, the seal assembly 96, 98 seals between the outer housing 22 and the surface of the heat exchanging body 53.

As shown in FIGS. 4A and 4B, the seal assembly 96, 98 comprises a mounting strip 74, a resilient section 82, and a sealing strip 84. In one embodiment, the mounting strip 74 comprises a substantially flat, rectangular base section 76 that extends along the entire length of the seal assembly 96, 98 and a support member 100 having a partially corrugated shape extending above the base section 76. The support member 100 may also be referred to as a reinforcing member that comprises a bent section, partially corrugated shape, or partial S-shape. In a manner as will be described in greater detail herein below with reference to FIGS. 5A and 5B, the support member 100 may improve the strength of the seal assembly 96, 98 by reducing the effects of over-flexing of the resilient section 82 at the interconnection point 102 of the mounting strip 74 and the resilient section 82. In one aspect, the mounting strip 74 may comprise one or more strips of thick metal, preferably steel, that may be joined together through spot welding, riveting, or any other known manner. In addition, the mounting strip 74 may comprise an increased thickness to provide mechanical strength to the seal assembly 96, 98 against warping and distortion.

Additionally, the mounting strip 74 may further comprise a series of apertures 80 that extend through the mounting strip 74. As shown in FIG. 4, each aperture 80 may comprise an elongated shape that extends along the width of the mounting strip 74. Although the apertures 80 are illustrated as having an elongated shape to facilitate mounting the seals over a range of vertical positions in the manner described below, the apertures 80 may take on any of a wide variety of shapes and remain within the scope of the invention.

The resilient section 82 may comprise a series of corrugated bellows 83, or S-shaped convolutions, that extend in and out of a plane defined by the mounting strip 74. The resilient section 82 preferably allows the seal assembly 96, 98 to flex inward and outward in the direction of the arrows 85 and also to rotatably deform in a plane substantially normal to the plane defined by the mounting strip 74. In addition, the corrugated bellows 83 may be configured to compress and decompress in a manner so as to allow the resilient section 82 to function as a spring. In one aspect, the resilient section 82 adapts to the effects of operating conditions, such as expansion from heat, so that it compresses and deforms in the same manner that a spring compresses and deforms. Additionally, when the operating condition is removed, the corrugated bellows 83 allow the resilient section 74 to recover to its original shape in a similar manner as a spring.

As illustrated in FIGS. 4A and 4B, the resilient section 82 may comprise a thickness of approximately 1/32 of an inch and a single layer of sheet material, such as steel or any of a wide variety of materials known to those skilled in the art. However, the resilient section 82 may also comprise any number of layers of material joined together in any of a wide variety of manners, such as through spot welding or riveting, to form varying degrees of thickness without departing from the scope of the present invention. In one aspect, the resilient section 82 may comprise a reduced thickness with respect to the thickness of the mounting strip 74. It should further be appreciated that the number of corrugated bellows 83 comprised by the resilient section 82 may vary without departing from the scope of the present invention.

In one embodiment, the sealing strip 84 extends outward from the resilient section 82 opposite the mounting strip 74, wherein the sealing strip 84 preferably extends in a direction substantially parallel to a plane defined by the mounting strip 74. The sealing strip 84 may further comprise a substantially straight outer edge 86 so as to seal the juncture between the inner surface of the sector plates and the outer surface of the rotor 53 and the outer housing 22 in a manner as will be described in greater detail herein below. In one aspect, the sealing strip 84 may comprise an increased thickness relative to the thickness of the resilient section 82 so as to provide increased mechanical strength to the seal assembly 96, 98 against warping and distortion. In addition, the sealing strip 84 may comprise one or more strips of thick metal, preferably steel, that may be joined together through spot welding, riveting, or any other known manner. It should be appreciated that the plane of the sealing strip 84 may be offset from the plane of the mounting strip 74 without departing from the scope of the present invention.

FIGS. 5A and 5B illustrate side views of the seal assembly 96, 98 mounted to the outer surface of at least one radial wall 60. As illustrated in FIGS. 5A and 5B, the seal assembly 96, 98 may comprise a sealing strip 84 that may provide a seal between the radial wall 60 and the inner surface of the sector plates 32, 34 or the axial sector plates 33a and 33b of the outer housing 22. For purposes of discussion, FIGS. 5A and 5B illustrate the seal assembly 96, 98 being used as an axial seal 98. The seal assembly 98 is thus mounted to the outer radial edge of a radial wall 60. However, the seal assembly 98 may also be mounted to the top or bottom edge of the radial wall 60 and used as a radial seal 96 in the manner shown in FIG. 1. In a manner as previously discussed, the radial seal 96 provides a seal at the juncture between the radial wall 60 and the inner surface of the top or bottom sector plates 32, 34.

As further illustrated in FIGS. 5A and 5B, the seal assembly 96, 98 may be mounted to the radial wall 60 via the mounting strip 74 and mounting devices, such as bolts and nuts 90, 92. Bolts 90 extend through the apertures 80 in the mounting strip 74 and also extend through corresponding apertures that lie along the edges of the radial walls 60. A nut 92 may then be screwed onto the bolt 90 to secure the base section 76 of the mounting strip 74 flat against the edge of the radial wall 60. It will be appreciated that any of a wide variety of mounting devices could also be used to mount the seal assembly 96, 98 to the radial walls 60.

As shown in FIGS. 5A and 5B, the seal assembly 96, 98 may be positioned on the radial walls 60 such that the outer edge 86 of the sealing strip 84 contacts the inner surface 30 of the sector plates 33a and 33b. Advantageously, the sealing strip 84 substantially maintains a seal between the radial walls 60 and the outer housing 22 to reduce leakage of gas between the angular sectors 62. In addition, the elongated apertures 80 may be configured to allow a user to adjust the position of the seal assembly 96, 98 relative to the outer housing 22 by sliding the seal assembly 96, 98 along the length of the apertures 80 until the desired position is achieved.

As discussed above, the structural components of the heat exchanging apparatus 20 undergo thermal distortion as a result of the operational temperature gradients in the heat exchanging apparatus 20. As shown in FIG. 5B, the temperature gradients cause the radial walls 60 to undergo thermal growth 88 and expansion toward the outer housing 22. Hence, the distance between the outer radial edge of the radial walls 60 and the side inner surface 30 of the outer housing 22 decreases. Advantageously, the resilient section 82 on the seal assembly 96, 98 allows the seal assembly 96, 98 to deflect as the distance decreases, as further described below. As previously described, the corrugated bellows 83 are configured to compress and expand in a spring-like manner so as to adapt to harsh operating conditions and decrease the overall size of the seal assembly 96, 98. As a result, the resilient section 82 allows the seal assembly to absorb the mechanical stresses created by the reduction in distance between the outer radial edge of the radial walls 60 and the inner surface 30 of the outer housing 22.

As illustrated in FIGS. 5A and 5B, the support member 100 may comprise a contact component 104, a biasing component 106, and a base component 108 that may be formed so as to resemble a partially corrugated shape or partial S-shape. The base component 108 comprises a substantially planar structure that distally extends in a direction substantially parallel to the radial wall 60. The biasing component 106 is attached to a first distal end of the base component 108 and comprises a first bend following the contour of the interconnection point 102 and a second bend opposing the first bend so as to form a partial S-shaped structure. The contact component 104 is attached to the biasing component 106 after the second bend and comprises a flat, elongated, planar structure that is substantially perpendicular to the base component 108.

In one embodiment, referring to FIG. 5B, as the heat exchanging body or the outer housing 22 rotates in a first direction 94 of rotation, the rotational load on the sealing strip 84 causes the seal assembly 96, 98 to deflect in a second direction 112 of rotation relative to the first direction 94 of rotation. The deflection of the seal assembly 96, 98 causes the contact component 104 of the support member 100 to engage and upwardly reinforce the lower bellow 83 of the resilient section 82 along the elongated portion of the contact member 104 in a manner so as to distribute the bending stress of the lower corrugated bellow 83 caused by the rotational load across the flat, planar surface of the contact component 104. Advantageously, the support member 100 reduces the effects of rotational stress at the interconnection point 102 by upwardly reinforcing the resilient section 82 at the location where the contact component 100 engages the lower portion of the corrugated bellows 83.

In addition, the deflection of the seal assembly 96, 98 causes rotational stress about the interconnection point 102 in the second direction 112, which causes compression energy to be stored in the biasing component 106 of the support member 100 in a manner similar to storing energy in a spring. In response to the force in the second direction 112 and the resultant stored energy in the biasing component 106, the biasing component 106 produces an opposing force in a third direction 114 opposite of the second direction 112 so as to further reinforce the lower bellow 83 of the resilient section 83 along the elongated portion of the contact member 104 and to distribute the rotational force across the flat, planar surface of the contact component 104. Advantageously, the support member 100 reduces the rotational stress at the interconnection point 102 by biasing and stabilizing the resilient section 82 at the contact location where the reinforcing support member 100 engages the lower portion of the corrugated bellows 83. Also, the support member 100 substantially inhibits over-flexing of the resilient section 82 when the seal assembly 96, 98 is deformed during rotation.

In one aspect, the corrugated bellows 83 expand and retract in response to the operational and/or rotational load so that the sealing strip 84 orients at an angle relative to the mounting strip 74. In particular, the ends of the corrugated bellows 83 opposite the first direction of rotation 94 are configured to compress together while the ends of the corrugated bellows 83 facing the direction of rotation are configured to expand apart. Advantageously, the corrugated bellows 83 recover back to their original shape when the operational and/or rotational load on the sealing strip 84 is removed, so that the sealing strip 84 re-orients and/or recovers to a position substantially parallel to the mounting strip 74. Therefore, the resilient section 82 provides flexibility to the seal assembly 96, 98 to facilitate the rotational deflection of the seal assembly 96, 98 in response to the rotation of the radial wall 60. In addition, the outer edge 86 of the sealing strips 84 maintains sliding contact with the sealing surface 30 to thereby maintain a secure seal between the radial walls 60 and the outer housing 22 in the manner that is shown in FIG. 5B.

In one embodiment, the support member 100 may be attached to the seal assembly 96, 98 so as to distally extend adjacent the lower portion of the corrugated bellows 83 of the resilient member 82. The support member 100 may comprise a bent section, or partially corrugated section, that reinforces the seal assembly 96, 98 in a manner so as to reduce the bending or over-flexing of the resilient section 82 at the interconnection point 102 where the corrugated bellows 83 interconnect with the mounting strip 74.

Advantageously, by reducing the amount of bending or over-flexing of the resilient section 82 at the interconnection point 102, the seal assembly 96, 98 may thereby be strengthened to substantially inhibit the resilient section 82 from fracturing or separating at the interconnection point 102. As illustrated in FIG. 5B, the support member 100 may be configured to substantially inhibit the damaging effects of over-flexing of the seal assembly 96, 98 when the resilient section 82 expands during thermal heating and/or is warped, deformed, and/or distorted during rotation or other various operational applications. For example, when the resilient section 82 produces a force in the first direction during rotation, the support member 100 produces an opposing force in the second direction opposite the first direction so as to increase the biasing strength of the seal assembly 96, 98 in the second direction during rotation.

In one aspect, the support member 100 may comprise a bent piece of metal, plastic, etc. that has contours similar to the contours of the beginning of the corrugated bellows 83 and may further be flexible such that the support member 100 bends and/or flexes in response to contact with the resilient section 82 in a manner as illustrated in FIG. 5B. However, as previously described with reference to FIG. 5B, the support member 100 may also provide a biased force against the resilient section 82 in opposition to the bending and/or flexing motion of the corrugated bellows 83 during rotation to thereby inhibit damage, fracture, separation, and/or breakage at the interconnection point 102.

In addition, as shown in FIG. 3, the thermal distortion caused by the temperature gradients may also cause the radial walls to warp such that the distance between the outer radial edge of the radial wall 60 and the side inner surface 30 of the outer housing 22 increases in size. In such a case, the thermal distortion may be opposite to that shown in FIG. 5B. Preferably, for this type of thermal distortion, the seal assembly 96, 98 may be initially installed on the radial wall 60 such that the sealing strip 84 may already be in a deflected position in the manner shown in FIG. 5B (i.e., the sealing strip is oriented at an angle relative to the mounting strip 96, 98 with the outer edge 86 contacting the inner surface 30 of the sector plates). In such a state, the resilient section 82 may comprise a loaded state, wherein, as the distance between the outer edge of the radial walls 60 and the inner surface 30 of the outer housing 22 increases, the operational load on the resilient section 82 may be gradually released. As a result, the resilient section 82 may then expand such that the sealing strip 84 orients parallel to the mounting strip 74. Thus, the contact between the outer edge 86 of the sealing strip 84 and the outer housing 22 may be maintained to preserve the seal between the radial walls 60 and the outer housing 22.

As previously mentioned above, the mounting section 74 and the sealing section 84 may comprise a thickness at least greater than the thickness of the resilient section 82, wherein the thicker sections 74, 84 may be resistant to bending. Hence, any bending of the seal assembly 96, 98 may be advantageously concentrated in the resilient section 82 so that the seal assembly 96, 98 may spring back and/or recover to its original shape and/or structure. In one aspect, the sealing section 84 and the mounting section 74 may each be approximately 1/16 inch thick.

Advantageously, the seal assembly 96, 98 with the support member 100 is configured to provide a substantially secure and reliable seal between the radial walls and the outer housing of a heat exchanging apparatus 20. In addition, the seal assembly 96, 98 is configured to rotationally deflect so that the seal assembly 96, 98 maintains contact with sealing surfaces when the thermal distortion occurs during operational applications, as well as when the movable heat exchanging body rotates. As a result, the resilient section advantageously provides flexibility and resiliency to the seal assembly 96, 98 so that it may deform in shape yet maintain a secure seal during rotation and thermal stress. Moreover, the support member 100 advantageously provides additional strength to the resilient section 82 so as to inhibit damage, separation, and/or breakage when under operational stress during rotation and thermal heating. Unlike prior art seals, the seal assembly 96, 98 rotationally deflects in response to the operational loads produced by rotational movement between the outer housing 22 and the movable heat exchanging body 53. After such operational loads are removed, the resilient section 82 advantageously springs back into shape so that a secure seal is sustained.

Although the foregoing description of the preferred embodiment of the preferred invention has shown, described, and pointed out the fundamental novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited by the foregoing discussion, but should be defined by the appended claims.

What is claimed is:

1. A regenerative heat exchanging device comprising:

a plurality of radial and axial sector plates positioned so as to define an intake conduit and an exhaust conduit, wherein the intake conduit receives cool air so as to provide air to a power plant, and wherein the exhaust conduit receives heated gases that are exhausted from the power plant;

a rotor attached to the plurality of radial and axial sector plates so as to rotate with respect thereto about an axis, wherein the rotor includes one or more heat absorbing sections that are alternatively rotated through the exhaust conduit and the intake conduit so that heat is absorbed in the exhaust conduit and is thereby transferred to the cool air in the intake conduit; and at least one seal having an outer edge, the at least one seal being mounted on an outer surface of the rotor so that the outer edge makes contact with an inner surface of the plurality of sector plates during rotation of the rotor so as to reduce the leakage of heat energy between the intake conduit and the exhaust conduit, wherein the at least one seal is deformable in a first direction that is opposite the direction of relative movement between the at least one seal and the inner surface in response to the outer edge of the seal making contact with the inner surface, and wherein the seal is simultaneously biased in a second direction opposite the first direction so that the outer edge of the at least one seal remains in contact with the inner surface over a range of distances between the rotor and the sector plate while the at least one seal rotates past the inner surface of the plurality of sector plates; and a support member having a biasing component with a bellowed contour that further reinforces the seal so as to inhibit damage to the seal during deformation of the seal in the first direction.

2. The device of claim 1, wherein the at least one seal further comprises a mounting section that allows the at least one seal to be mounted to an outer surface of the rotor, a sealing section defining the straight outer edge and positioned to contact the inner surface, and a resilient section that expands or contracts in a direction normal to the inner surface.

3. The device of claim 2, wherein the resilient section can rotatably deform about an axis normal to the inner surface.

4. The device of claim 3, wherein the mounting section comprises a base section that defines a first plane, and wherein the resilient section comprises one or more corrugated bellows that extend in and out of the first plane defined by the base section.

5. The device of claim 4, wherein the biasing component of the support member comprises a partially corrugated shape that substantially contours the shape of the lower portion of the one or more corrugated bellows of the resilient section of the seal.

6. The device of claim 5, wherein the support member further comprises a base component having a substantially planar structure that distally extends in a direction substantially parallel to the mounting section of the seal, and wherein the biasing component of the support member is attached to a first distal end of the base component and comprising a first bend following the contour of the lower portion of the one or more corrugated bellows of the resilient section and a second bend opposing the first bend so as to form a partial S-shaped structure, and wherein the support member further comprises a contact component attached to the biasing component after the second bend and comprising a flat, elongated, planar structure that is substantially perpendicular to the base component.

7. The device of claim 6, wherein the contact component of the support member engages and upwardly reinforces the lower portion of the one or more corrugated bellows of the resilient section of the seal along the elongated portion of the contact component in a manner so as to distribute the bending stress of the one or more corrugated bellows along the elongated portion of the contact component during rotation.

8. The device of claim 7, wherein the biasing component produces an opposing force in response to a rotation force produced during rotation of the rotor so as to further reinforce the lower portion of the one or more corrugated bellows along the elongated portion of the contact component.

9. The device of claim 1, wherein the seal is at least one of a radial seal and an axial seal.

10. A regenerative air preheater comprising an outer housing defining a first conduit and a second conduit, a heat exchanging body within the outer housing, the heat exchanging body configured to rotate with respect to the outer housing so that portions of the heat exchanging body are cyclically exposed to the first conduit and second conduit, and at least one seal located between the outer housing and the heat exchanging body, the seal including a mounting section connected to the heat exchanging body, a sealing section having a substantially straight outer edge that is contact the outer housing, a means for resiliently and rotationally deflecting the seal in a direction opposite to a direction of rotation of the heat exchanging body so that the sealing section maintains contact with the outer housing over a range of distances between the heat exchanging body and the outer housing, and a means for reinforcing the seal in a manner so as to reduce over-flexing of the sealing section when the seal is deflected during rotation, wherein the means for reinforcing the seal includes resiliently biasing the seal with a reinforcing section having a bellowed contour.

11. The regenerative air preheater of claim 10, wherein the portions of the heat exchanging body are defined by walls that extend radially outward from an axis of rotation of the heat exchanging body.

12. The regenerative air preheater of claim 11, wherein the mounting section of the seal is mounted to an outer edge of the walls.

13. The regenerative air preheater of claim 10, wherein the means for resiliently and rotationally deflecting the seal comprises a series of corrugations interposed between the sealing section and the mounting section.

14. The regenerative air preheater of claim 13, wherein the bellowed contour of the reinforcing section includes a partially corrugated structural shape that substantially contours the structural shape of the lower portion of the series of corrugations interposed between the sealing section and the mounting section.

15. The regenerative air preheater of claim 14, wherein the reinforcing section further comprises a biasing component attached to a first distal end of the mounting section, wherein the biasing component comprises a first bend following the contour of the lower portion of corrugations and a second bend opposing the first bend so as to form a partial S-shaped structure.

16. The regenerative air preheater of claim 15, wherein the reinforcing section further comprises a contact component attached to the biasing component after the second bend wherein the contact component comprises a flat, elongated, planar structure that is substantially perpendicular to the mounting section.

17. The regenerative air preheater of claim 16, wherein the contact component engages and upwardly reinforces the lower portion of the corrugations in a manner so as to distribute the bending stress of the corrugations along the elongated portion of the contact component during rotation.

18. The regenerative air preheater of claim 17, wherein the biasing component additionally deflects the seal in the direction opposite to the direction of rotation of the heat exchanging body in response to rotation of the heat exchanging body so as to further reinforce the lower portion of the corrugations along the elongated portion of the contact component.

19. The regenerative air preheater of claim 10, wherein the seal is at least one of a radial seal and an axial seal.

20. A seal assembly for a regenerative preheater having a housing and a heat exchanging body that rotate with respect to each other in a first direction and define an interface therebetween, the seal assembly comprising:

a seal member that is adapted to be interposed between the heat exchanging body and the housing so as to be positioned within the interface therebetween, wherein the seal member includes a deformable biasing section whereby the seal when in physical contact with at least a portion of both the housing and the heat exchanging body resiliently deforms in a second direction opposite the first direction of rotation between the housing and the heat exchanging body but is biased in the fist direction; and a reinforcing member interposed between the housing and the heat exchanging body, wherein the reinforcing member includes a biasing section having a bellowed contour that is positioned with respect to the seal member so as to reinforce the seal member when the seal member is deformed in the first direction to thereby inhibit damage to the seal member as a result of the deformation.

21. The assembly of claim 20, wherein the seal member includes a mounting section that mounts to the rotor a contact section that contacts the housing with the deformable biasing section interposed therebetween.

22. The assembly of claim 21, wherein the mounting section and the contact section of the seal member are urged towards each other when the contact section contacts the housing.

23. The assembly of claim 22, wherein the reinforcing member is mounted to the rotor so that the reinforcing member inhibits movement of the contact section and the mounting section towards each other.

24. The assembly of claim 23, wherein the biasing section of the reinforcing member provides resilient biasing against movement of the contact section of the seal member towards the mounting section of the seal member.

25. The assembly of claim 24, wherein the biasing section of the reinforcing member comprises at least one bellows so as to define the bellowed contour thereof.

26. The assembly of claim 21, wherein the deformable biasing section of the seal member comprises a bellows section having a plurality of sub-sections that extend in direction substantially parallel to the first direction and a plurality of curved sections so that when the contact section contacts the housing, the contact section moves in the second direction thereby urging at least a portion of the plurality of sub-sections to deform in a direction substantially perpendicular to the first direction and wherein the plurality of curved sections provide resilient biasing in opposition to the deformation of the plurality of subsections.

27. The assembly of claim 26, wherein a portion of a plurality of sub-sections of the bellows section of the seal member contacts the reinforcing member so that the reinforcing member inhibits movement of the at least a portion of the subsection in the direction substantially perpendicular to the first direction.

28. The assembly of claim 27, wherein the reinforcing member further provides a biasing force in a direction opposite the movement of the at least a portion of the bellows section.

29. The assembly of claim 24, wherein the reinforcing member comprises a mounting section that mounts to the rotor, a contact section that contacts the seal member and a biasing section.

30. The assembly of claim 29, wherein the biasing section comprises a bellows section.

31. The assembly of claim 30, wherein the contact section comprises an elongate section that extends in a direction substantially parallel to the first direction and wherein the contact section contacts at least one of the sub-section so as to oppose movement of the plurality of subsections in the direction substantially perpendicular to the first direction.

* * * * *

UNITED STATES PATENT AND TRADEMARK OFFICE
CERTIFICATE OF CORRECTION

PATENT NO. : 6,789,605 B1
DATED : September 14, 2004
INVENTOR(S) : Jackie L. Kaser It is certified that error appears in the above-identified patent and that said Letters Patent is hereby corrected as shown below:

Column 13,
Line 53, please delete "rotation" and insert -- rotational --, therefor.

Column 14,
Line 3, please delete "contact" and insert -- contacting --, therefor.

Column 15,
Line 3, please delete "fist" and insert -- first --, therefor.
Line 30, please delete "bellows" and insert -- bellow --, therefor.

Column 16,
Line 9, please delete "subsections" and insert -- sub-sections --, therefor.

Signed and Sealed this

Thirteenth Day of December, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,789,605 B1 |
| APPLICATION NO. | : 10/178061 |
| DATED | : September 14, 2004 |
| INVENTOR(S) | : Kaser |

It is certified that error appears in the above-identified patent and that said Letters Patent is hereby corrected as shown below:

In the Drawings

The drawing sheet 1 of 7 consisting of Fig(s) 1 should be deleted and substitute therefore the attached drawing sheet 1 of 7 consisting of Fig(s) 1.

Signed and Sealed this

First Day of December, 2009

David J. Kappos
*Director of the United States Patent and Trademark Office*